United States Patent [19]

Anderson, Jr. et al.

[11] 4,267,647

[45] May 19, 1981

[54] APPARATUS FOR DEMONSTRATING MAGNETIC FORCE

[76] Inventors: Clarence E. Anderson, Jr.; Rhawn F. Anderson, both of 1802 Morris Rd., SE., Washington, D.C. 20020

[21] Appl. No.: 832,018

[22] Filed: Sep. 9, 1977

Related U.S. Application Data

[63] Continuation-in-part of Ser. No. 633,469, Nov. 10, 1975, abandoned.

[51] Int. Cl.³ ............................................. G09B 23/18
[52] U.S. Cl. ................................................... 35/19 A
[58] Field of Search ................. 35/19 A; 46/236, 237, 46/238, 239

[56] References Cited

U.S. PATENT DOCUMENTS

| | | | |
|---|---|---|---|
| 1,481,256 | 1/1924 | Dols | 46/238 |
| 3,703,653 | 11/1972 | Tracy | 310/24 |
| 3,801,095 | 4/1974 | Woron | 46/236 X |
| 3,879,622 | 4/1975 | Ecklin | 310/80 |

OTHER PUBLICATIONS

Magnets, Underhill, 1924, p. 2, McGraw-Hill.
Am. J. Physics, vol. 44, No. 3, p. 283, 3/76.

*Primary Examiner*—Harland S. Skogquist
*Attorney, Agent, or Firm*—Lowe, King, Price & Becker

[57] ABSTRACT

An apparatus for demonstrating magnetic force comprises a plurality of disc-shaped rotors angularly displaced from each other on a common shaft and a number of magnets equispaced along the rims of the rotors. Stationary field magnets encircle the rotors in close proximity to the rotor magnets with like-poles of the rotor magnets and the field magnets facing each other. A high permeance magnetic shield is located in the air gap between each field magnet and the rotor to block opposing magnetic fluxes. Magnetic attraction between the rotor magnets and field magnets tend to rotate the rotor. In one embodiment, the shield at each field magnet is mounted on a pivot and is moved out of the air gap by arms attached to the rotor. The rotor magnets are first attracted to the magnetic shield, and, as a corresponding rotor and field magnet approach each other during rotation of the rotor, one of the arms causes the shield to pivot out of the gap to expose the rotor magnet to the field magnet. This creates a magnetic repulsion "kick" tending to further rotate the rotor. A weighted portion of the shield below the pivot, and an additional set of arms rotating with the rotor, automatically reposition the shield during rotation of the rotor. In another embodiment, stationary magnetic shielding located in the air gap is shaped to block only a portion of each field magnet from the gap. As the rotor is rotated toward the shielding by magnetic attraction, a "flywheel effect" causes the rotor magnet to swing past the shielding into view of the partially exposed field magnet to create the additional kick.

5 Claims, 11 Drawing Figures

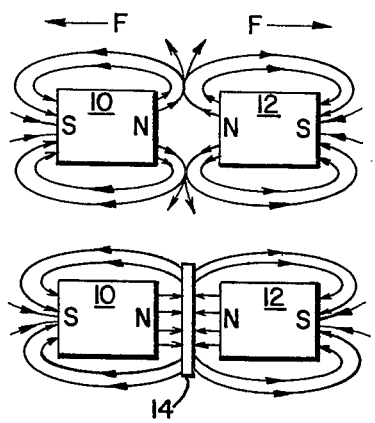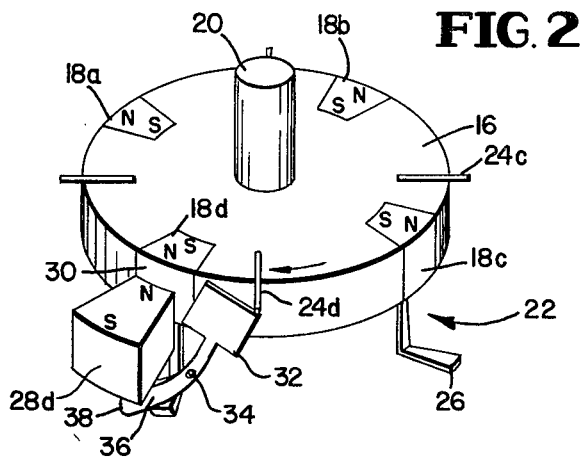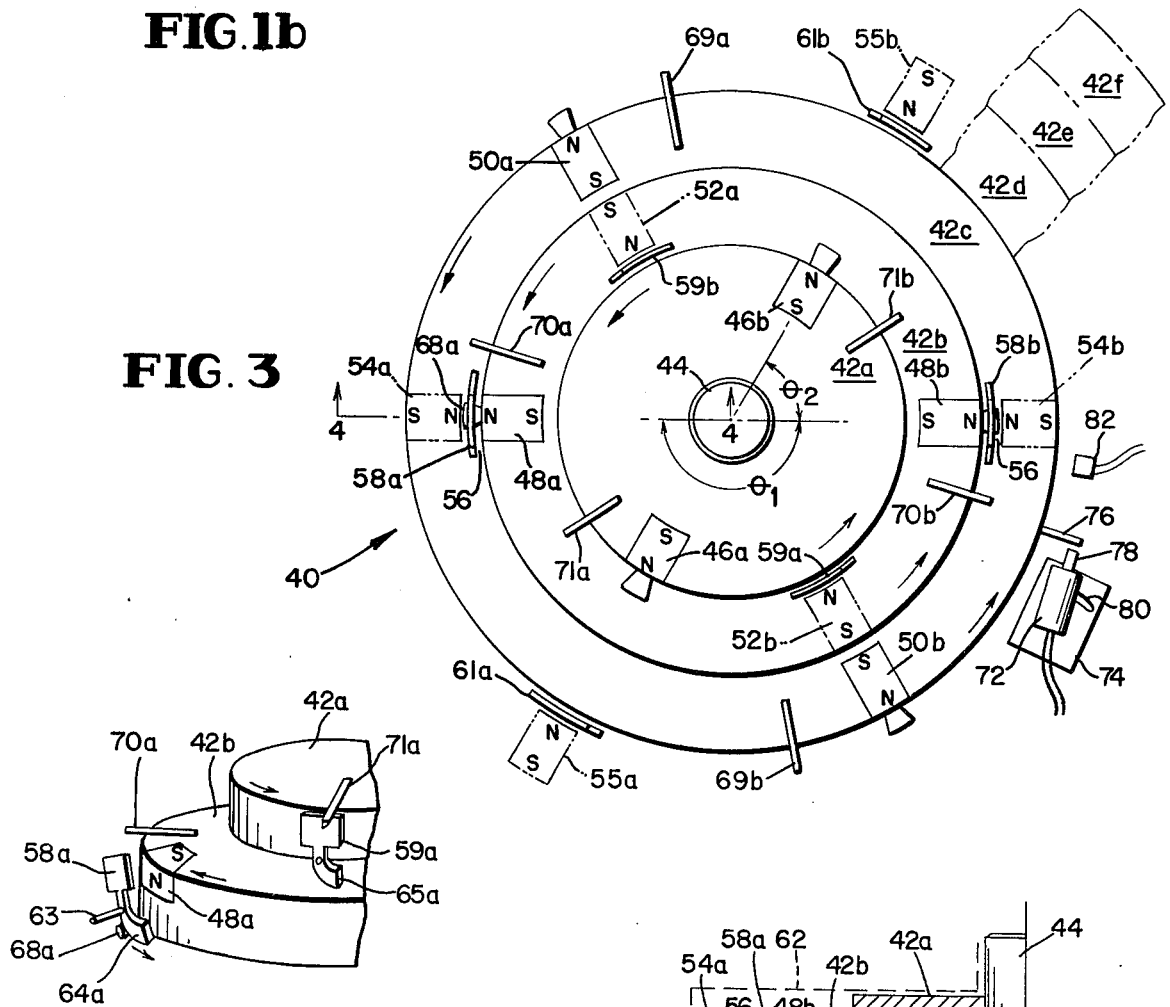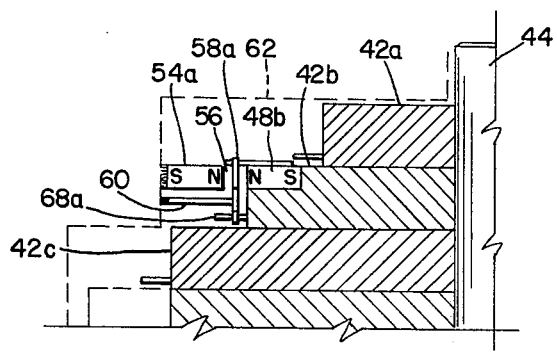

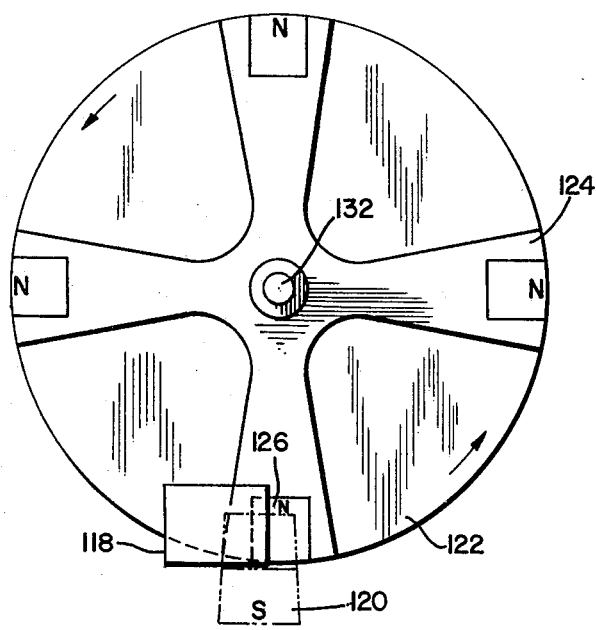
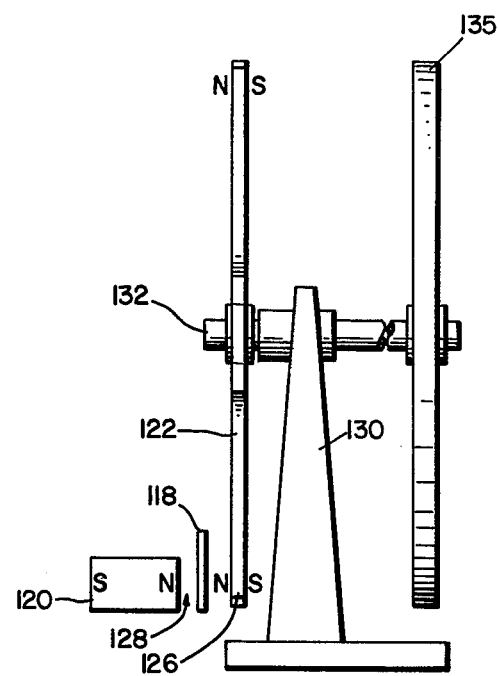
FIG. 7
FIG. 8
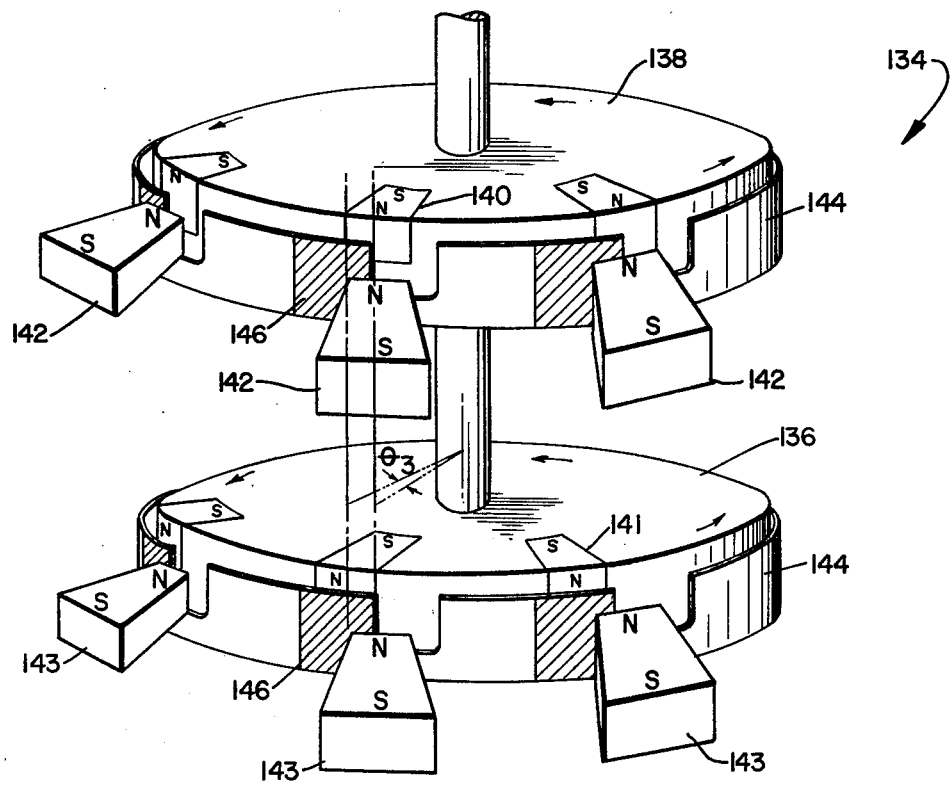
FIG. 9

APPARATUS FOR DEMONSTRATING MAGNETIC FORCE

This application is a continuation-in-part of copending Ser. No. 633,469 filed Nov. 19, 1975 and now abandoned.

BACKGROUND OF THE INVENTION

The present invention relates generally to an apparatus for demonstrating magnetic force and more particularly to such an apparatus wherein high permeance magnetic shielding is selectively displaced from an air gap between rotor-field magnet pairs.

In classroom instruction, particularly in teaching physics to young people, there is a trend toward providing laboratory demonstrations to illustrate physical phenomena. For example, in teaching magnetism, magnetic flux is often illustrated by disposing fine magnetic particles, such as iron filings, over a cardboard layer which is in turn placed over a magnet. The iron filings become oriented in a pattern corresponding to the lines of magnetic flux generated by the magnet.

In teaching the principles of magnetic force, it is particularly desirable to provide a demonstration to supplement the lecture. The demonstration should be dynamic and entertaining to attract and retain the attention of the students and to act as a memory aid. Furthermore, the demonstration should be simple to illustrate the phenomenon of magnetic force and permit the students themselves to operate the apparatus, yet be capable of illustrating all basic aspects of magnetic force, i.e., attraction, repulsion and the effect of magnetic shielding.

OBJECTIVES OF THE INVENTION

Accordingly, one object of the present invention is to provide a novel apparatus for demonstrating magnetic force.

Another object of the present invention is to provide a novel apparatus for converting magnetic force into mechanical movement.

Another object of the present invention is to provide an apparatus for demonstrating magnetic attraction as well as magnetic repulsion in a unique and entertaining manner.

Another object of the present invention is to provide an apparatus for demonstrating magnetic attraction, repulsion and shielding in a dynamic manner easily remembered by students.

Another object of the present invention is to provide an apparatus for demonstrating magnetic force including movable and stationary magnets as well as stationary magnetic shielding.

Another object of the present invention is to provide an apparatus for demonstrating magnetic force including moveable and stationary magnets as well as magnetic shielding that is successively disposed in and removed from an air gap between the movable and stationary magnets during operation.

BRIEF DESCRIPTION OF THE INVENTION

In accordance with the invention, at least one rotor having a series of magnets equispaced along the rim of the rotor, is mounted on a shaft and is encircled by a plurality of stationary field magnets. Like-poles of the rotor magnets and field magnets face each other and are slightly spaced apart to form an air gap. Magnetic shielding is located in the air gap between the rotor and field magnets to block opposing magnetic fluxes. Magnetic attraction between the rotor magnets and the shielding as well as magnetic repulsion between rotor and field magnets tends to rotate the rotor.

In one embodiment, the magnetic shielding comprises a high permeance magnetic shield mounted on a pivot via a stem in the air gap at each field magnet. The stem has an oversized portion beneath the pivot to help maintain the shielding vertical in the air gap. A first set of arms is attached to the lower surface of the rotor and extends outwardly therefrom to successively displace the shields from the air gap during rotation of the rotor. A second set of arms attached to the upper surface of the rotor successively repositions the shields in the gap.

An initial rotation of the rotor is induced by a solenoid actuator. During rotation, the rotor magnets are first attracted to the high permeance magnetic shields in the air gap. As each rotor magnet successively approaches a stationary field magnet, one arm of the first set of arms pivots the corresponding shield out of the air gap, and magnetic repulsion between the rotor and field magnet imparts an additional "kick" to the rotor. Then, as the shields are successively pivoted out of the air gap, each shield tends to realign itself vertically due to the oversized lower portion, and one arm of the second set of arms attached to the rotor, brushes the top of the shield to reposition and stabilize it in the gap. During rotation, the rotor experiences several kicks caused by successive field magnet-shield pairs.

In another embodiment, a stationary high permeance magnetic shield is located in the air gap adjacent each field magnet. Only a portion of each field magnet is blocked by the shield, with the remainder of each of the field magnets being exposed to the rotor. The rotor magnets are first attracted to the magnetic shields. As the rotor is rotated due to magnetic attraction, the inertia of the rotor (flywheel effect) causes the rotor magnets to overshoot the magnetic shields and come into view of the stationary field magnets. Magnetic repulsion between the rotor and field magnets imparts an additional kick to the rotor.

In additional embodiments, the effect of magnetic force is enhanced by providing a plurality of rotors on a common shaft, and angularly displacing the rotors relative to each other to cause successive "kicking" of the rotor assembly as each rotor magnet sweeps past a corresponding field magnet and shield. A similar effect is provided by angularly displacing sets of field magnets relative to adjacent sets, with the rotors oriented in-line with each other on the common shaft.

Still other objects and advantages of the present invention will become readily apparent to those skilled in this art from the following detailed description, wherein we have shown and described only the preferred embodiments of the invention, simply by way of illustration of the best modes contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 1a is a diagram of a pair of magnets with like-poles facing each other for magnetic repulsion;

FIG. 1b is similar to the diagram shown in FIG. 1a, including a high magnetic permeance shield located between the magnets;

FIG. 2 is a perspective view of a simplified version of one preferred embodiment of the invention;

FIG. 3 is a top view of a preferred embodiment of the present invention based on the version of FIG. 2;

FIG. 4 is a cross-sectional view of the embodiment shown in FIG. 3 taken along the line 4—4;

FIG. 5 is a partial perspective view of the embodiment of the invention shown in FIG. 3;

FIG. 7 is a side view of another preferred embodiment of the invention;

FIG. 8 is an end view of the preferred embodiment shown in FIG. 7; and

FIG. 9 is a perspective view of another preferred embodiment of the invention based on the embodiment of FIGS. 7 and 8.

DETAILED DESCRIPTION OF THE PREFERRED EMBODIMENTS

Figure 6A:
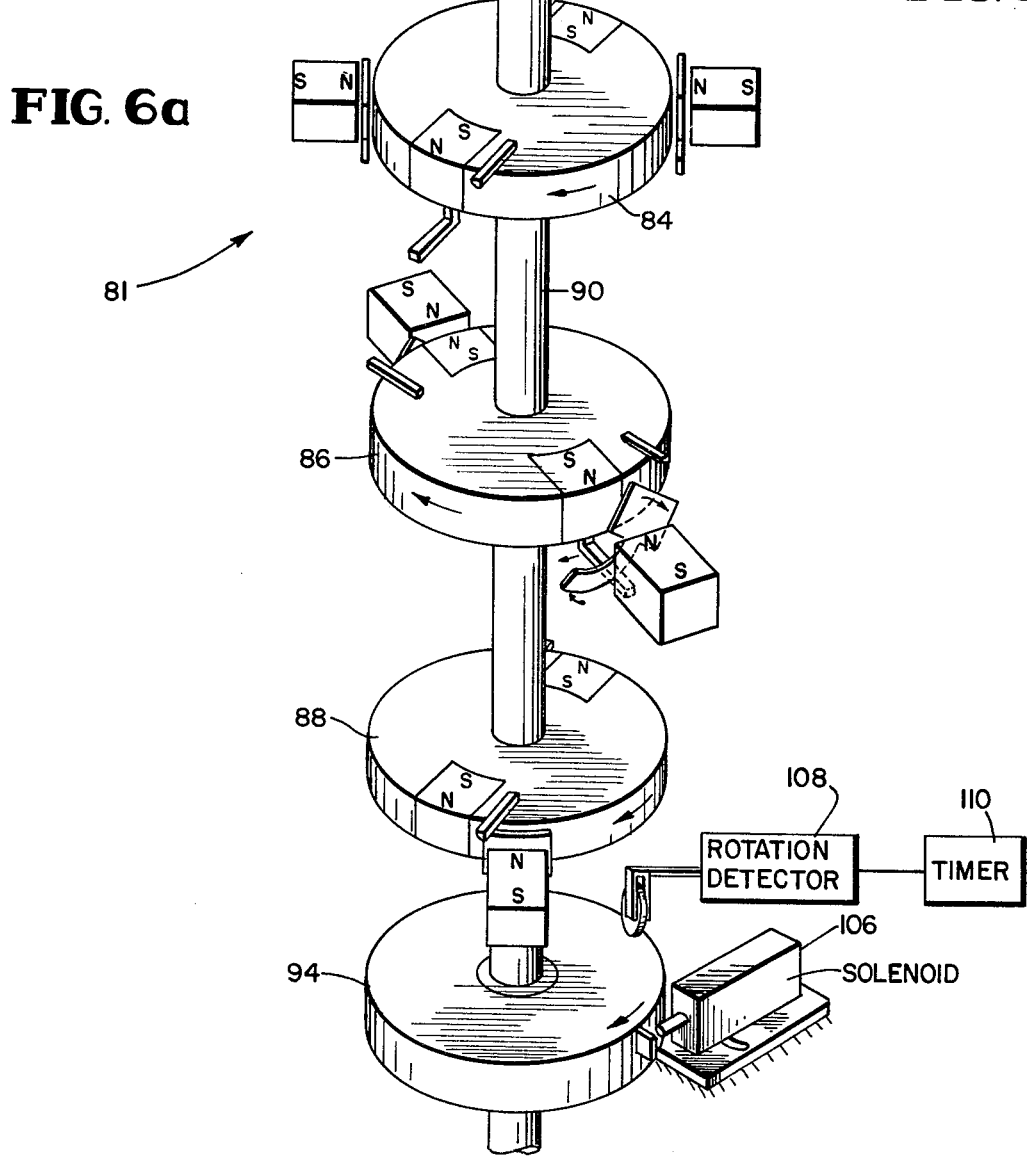
FIG. 6a is a perspective view of another preferred embodiment of the invention based on the version of FIG. 2.

Referring to FIG. 1a, a pair of permanent magnets 10 and 12 is shown with like-poles facing each other, i.e., with the north pole of magnet 10 facing the north pole of magnet 12. Magnetic flux, represented by the curved lines, flows between the north pole and south pole of each magnet. The interaction of the magnetic fluxes in the region between magnets 10 and 12 causes a magnetic force F to be exerted on each magnet, and since like-poles are adjacent to each other, the magnetic force is repulsive.

In FIG. 1b, a high magnetic permeance shield 14 is located between magnets 10 and 12. The shield 14 offers low reluctance to magnetic flux and functions as a magnetic "short circuit" to magnetic flux. The result is a magnetic attraction between each of the magnets 10 and 12 and shield 14, but since there is no interaction of the fluxes, there is no repulsion between the like-poles of the magnets. In accordance with the invention, these magnetic phenomena, i.e., attraction, repulsion, and shielding, are employed to rotate a rotor for amusement or demonstration.

Referring now to FIG. 2, a simplified version of one preferred embodiment of the invention comprises a disc-shaped rotor 16 having permanent magnets 18a-d embedded in the periphery of the rotor. The rotor 16 itself is formed of a non-magnetic material mounted on shaft 20, and each of the magnets 18a-d is seated in the rotor with the north pole directed outwardly therefrom.

A first set of arms 22 is attached to the lower surface on rotor 16 and the arms are L-shaped with a lower portion or stem 26 extending outwardly from the rotor. A second set of arms 24 is mounted on the upper surface of rotor 16 and also extends outwardly therefrom. Arms 26 are mounted to the rotor centrally with respect to each magnet 18a-d, but arms 24 are each angularly displaced from the magnets, as shown. Although rotor 16 is free to rotate with shaft 20 either clockwise or counterclockwise, rotor 16 is shown rotating clockwise in FIG. 2 for the present discussion.

Stationary field magnets 28a-d corresponding respectively to rotor magnets 18a-d are disposed around the periphery of rotor 16, and are equispaced around the rotor (only one field magnet 28d is shown). The field magnets 28a-d are spaced apart from the periphery of rotor 16 to form air gaps, such as gap 30, between field magnet 28a and rotor 16. The field magnets 28a-d are oriented with the north pole toward rotor 16 so that the like-poles of the field magnets and rotor magnets 18a-d are facing each other in the air gap 30.

A high magnetic permeance shield 32 is located in air gap 30 at each field magnet 28a-d. The shields 32 are mounted to a pivot 34 with stem 36, and are free to pivot into and out of gap 30. A lower portion 38 of the stem 36 is oversized so that the center of gravity of the shield 32 is below pivot 34 tending to maintain the shield vertical within air gap 30. The lower portion 38 of stem 36 extends below arm 26 and, during rotation of rotor 16, the arm strikes the stem causing shield 32 to pivot clockwise out of the air gap 30. As rotor 16 continues to rotate, arm 24d (FIG. 2) brushes across the top of shield 32 urging the shield back toward a vertical position, assisted by the weight of lower oversized portion 38 of stem 37. Arm 24d tends to stabilize the shield 32, i.e., to minimize any swinging of the shield during its repositioning in the air gap 30.

The operation of rotor 16, field magnets 28 and shields 32 will be discussed in more detail with respect to the embodiment shown in FIGS. 3-4 below; however, as an overview, an initial rotation is imparted to rotor 16 using manual or powered means, such as a solenoid. Magnetic attraction between rotor magnets 18a-s and the high permeance shields 32 causes attraction between the shields and rotor magnets during rotation of the rotor 16. As the rotor magnets 18a-d approach the field magnets 28, arms 26 pivot shield 32 out of the air gap 30, as shown in FIG. 2. There is some magnetic attraction between the rotor magnets and the shields 32, tending to slow rotation, but it is overcome by the angular moment of inertia of the relatively massive rotor 16. As the shield 32 is pivoted out of the air gap 30, the opposing magnetic fluxes of the field magnet 28 and rotor magnet 18 cause magnetic repulsion between the two magnets. The magnetic repulsion tends to further rotate rotor 16, and arms 24 help relocate shields 32 to the vertical position in front of each field magnet 28 in gap 30. As aforementioned, repositioning of the shields 32 is assisted by the oversized lower portion 38 of stems 36 supporting the shields as well as by magnetic attraction between the north pole of field magnets 28 and the shields 32. Each time a rotor magnet 18 passes adjacent a field magnet 28, there is a magnetic "kick" imparted to the rotor. The mass of the rotor only partially integrates or "smooths out" the rotor.

Referring now to FIGS. 3-5, another preferred embodiment of the invention comprises a multiple rotor assembly 40 having six concentric rotors 42a-f (rotors 42a-c are shown in detail in FIG. 3, but rotors 42d-f are only partially shown in phantom for simplicity). The rotors 42a-f are mounted on a common shaft 44 and have successively decreasing diameters with the diameter of rotor 42a being smallest (see also FIG. 4). A pair of diametrically opposed magnets is embedded in the periphery of each rotor. For example, rotor 42a contains magnets 46a and 46b, rotor 42b contains magnets 48a and 48b, and rotor 42c contains magnets 50a and 50b. Obviously, additional magnets can be embedded in the periphery of each rotor, e.g., four magnets as in FIG. 2, so long as the magnets are equispaced around the periphery. The rotor magnets are angularly spaced apart from each other on each rotor according to the formula:

$$\theta_1 = 360/n_1$$

where $\theta_1$ is the angular displacement between adjacent magnets, and $n_1$ is the number of magnets embedded in each rotor.

The rotor magnets 46–50 on each rotor are angularly displaced relative to the rotor magnets embedded in adjacent rotors to minimize interaction of the magnetic fluxes generated by the magnets on different rotors. For example, magnet 46b on rotor 42a and magnet 48b on rotor 42d are angularly displaced from each other by 60° (since, in the embodiment of FIG. 3, apparatus 40 contains six rotors).

In general, the magnets on adjacent rotors are angularly displaced from each other according to the formula:

$$\theta_2 = 180/n_2$$

where:

$\theta_2$ is angular displacement between magnets on adjacent rotors; and $n_2$ is the number of rotors.

Stationary field magnets are located adjacent each rotor and spaced apart from the periphery of the rotor to form an air gap. For example, field magnets 54a and 54b are located adjacent rotor 42b (see FIG. 4) at the same vertical level as the rotor, and are spaced apart from the periphery of the rotor to form an air gap 56 therebetween. High magnetic permeance shields 58a and 58b, each similar to shield 32 in FIG. 2, are mounted in air gaps 56 on pivots 60.

Although not shown in detail for simplicity, the field magnets and shields may be mounted to a transparent cover 62 (FIG. 4) which maintains the field magnets and shields in proper position with respect to rotor magnets 46, 48, 50, etc., and is removable from the rotor assembly. The cover 62 is formed of a transparent, non-ferromagnetic material, such as clear polyethylene. The stationary field magnets 52, 54 and 55 (only three sets of field magnets as shown in FIG. 3 for simplicity) are also equispaced around the periphery of the rotors 42a–42c and, in the example shown, are displaced from corresponding field magnets on adjacent rotors by 60°.

A high permeance magnetic shield, such as shield 58a in FIG. 4, is located adjacent each of the field magnets and contains, as best seen in FIG. 5, a curved lower stem 64 supporting the shield to a pivot 63. The shields 58 are mounted to the cover 62 via pivots 63 and are free to pivot out of the air gap formed between a field magnet and rotor. The lower portion of the stem 64 is oversized and is substantially more massive than the remainder of the stem and shield so that the shield tends to remain vertical in the air gap. A first set of arms is connected to the periphery of each rotor (e.g., arms 68a are connected to rotor 42b, as shown in FIGS. 3–5) and extends outwardly from the periphery beyond stem 64 of shields 58a. Referring to FIGS. 4 and 5, during rotation of the rotor assembly 40, arm 69a impinges on stems 64a of shield 58a causing the shield to pivot out of the air gap between field magnet 54a and rotor magnet 48a.

A second set of arms 69–71 attached to the upper surfaces of the rotors 42a–c, extends outwardly from the rotors above the corresponding shields 58, 60, and 61. The arms 69–71 are located behind corresponding rotor magnets. During rotation, arm 70a is angularly displaced from rotor magnet 48a on rotor 42 so that the arm brushes over the top of shield 58a after the shield has been pivoted out of the air gap by arm 68a. During rotation of the rotor assembly 40, a field magnet is initially blocked by a shield such as shield 58a in FIG. 5, and arm 68a pivots shield 58a out of the air gap between the corresponding field magnet and rotor. The shield 58a is then repositioned vertically by the weight of the oversized lower portion of the stem supporting the shield (e.g., stem 64a in FIG. 5 assisted by arm 70a). During rotation of the rotor, there is attraction between the rotor magnets and shields, and subsequent repulsion between rotor magnets and field magnets as the shields are displaced from the air gap to cause successive kicking of the rotor.

Referring to FIG. 3, rotor magnets 48a and 48b are adjacent field magnets 54a and 54b, with shields 58a and 58b just about to become pivoted out of the air gap. As the shields 58a and 58b are pivoted from the air gap, magnetic repulsion between rotor magnets 48a and 48b, and field magnets 54a and 54b impart a magnetic "kick" to the rotor assembly 40 for continued rotation. Shortly thereafter, arms 70a and 70b rotate adjacent field magnets 54a and 54b and help to reposition the shields 58a and 58b vertically in the air gap. After a rotation of 60° by assembly 40, rotor magnets 46a and 46b become adjacent field magnets 52a, 52b, and shields 59a, 59b, and magnetic attraction and repulsion, as described above, are repeated to further rotate the assembly 40. After an additional rotation of 60° by assembly 40, rotor magnets 50a and 50b on rotor 42c become adjacent field magnets 55a, 55b, and shields 61a, 61b, etc., for continued rotation of assembly 40.

As aforementioned, there are rotor magnets disposed on each of the rotors 42a–f shown in FIG. 3, and magnetic forces are imparted on successive ones of the rotors each 60° interval of rotation of the rotor assembly 40. Accordingly, the assembly 40 experiences a magnetic "kick" each 60° rotation interval, the mass of the rotor assembly only partially integrating or "smoothing" out the kicks during rotation.

Obviously, the assembly must receive external energy to begin rotating or to achieve sustained rotation. In order to impart an initial rotation to assembly 40, we have provided a conventional electrical solenoid 72 (FIG. 3) mounted on a block 74 and aligned to impinge on a flange 76 attached to the periphery of one of the rotors such as rotor 42c. When solenoid 72 is energized, armature 78 is drawn out of the body of the solenoid 72 and applies an impulse to the assembly via flange 76 tending to rotate the assembly. Subsequently, the solenoid 72 is manually pivoted away from the assembly 40 on a channel 80 formed in the block 74 in order to provide clearance between flange 76 and solenoid during rotation of the assembly.

In practice, the effect of the magnetic force is demonstrated by initially removing cover 62 (FIG. 4) supporting the field magnets and shields, and causing assembly 40 to rotate using solenoid 72. The time duration of rotation of assembly 40 may be monitored by conventional means such as a photodetector 82 viewing the periphery of rotor 42c. Rotor 42c may contain, for example, an array of vertical stripes, and rotation of the rotor modulates the output of photocell 82. Any modulation of the output of photocell 82 indicates that there is rotation of rotor assembly 40. After the time duration of rotation of assembly 40 is determined, the procedure is repeated with cover 62, carrying the field magnets and shield, replaced as in FIG. 4. The timer demonstrates that there is no difference in time duration of rotation due to the law of conservation of energy. Any "kicking" of the rotor assembly during rotation, observable through the transparent cover 62, is also attributable to the magnetic force.

Figure 6B:
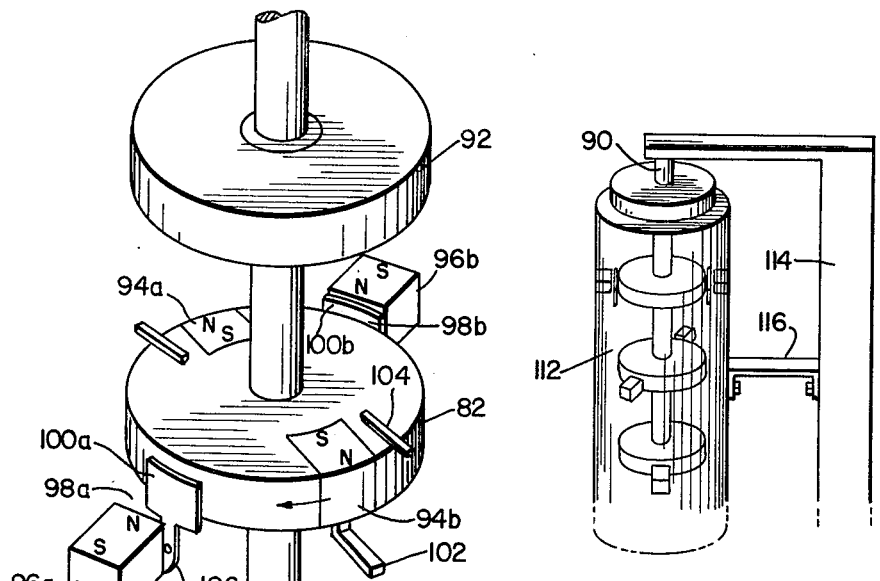
FIG. 6b is a partial perspective view of the embodiment of FIG. 6a including a removable cover for supporting the field magnets and shields.

Referring now to FIGS. 6a and 6b, assembly 81, which is a modification of the embodiment shown in FIGS. 3-5, includes a plurality of disc-shaped rotors 82, 84, 86 and 88 spaced apart from each other on a common shaft 90. At opposite ends of the shaft 90, flywheels 92 and 94 increase the angular moment of inertia of the assembly and smooth out any "kicking" of the assembly during rotation. The rotors 82-88 each contain a pair of magnets embedded therein (e.g., magnets 94a and 94b are embedded in rotor 82). Stationary field magnets 96a and 96b are located adjacent rotor 82 and are spaced apart therefrom to form air gaps 98a and 98b. High magnetic permeance shields 100a and 100b are located respectively in gaps 98a and 98b and are mounted to pivot outside the air gap when impinged on by arms 102 attached to the lower surface of each rotor. Arms 102 are L-shaped and extend outwardly from the rotor beyond stem 106 of each shield 100. Arms 104 attached to the upper surface of rotors 82-88 help reposition the shield 100 vertically in the air gap, as discussed above with respect to the embodiment of FIGS. 3-5.

The assembly 81 shown in FIG. 6a, functions similarly to assembly 40, with successively one rotor receiving a magnetic "kick" each 90° interval of the assembly (this is because there are only four rotors 82-88 in assembly 81, compared with six rotors 42a-f in FIGS. 3-5). Initial rotation is imparted to flywheel 94 of assembly 81 by solenoid 106, and the time duration of rotation of the assembly is determined with a conventional contact rotation detector 108 and timer 110.

Referring to FIG. 6b, the field magnets 96 and shields 100 are supported in place adjacent the rotors 82-88 with a transparent cover 112 mounted to a stand 114 and stabilized by bracket 116. As discussed above with respect to cover 62, the cover 112 can be removed to perform the initial measurement of time duration of rotation of assembly 81, and then replaced to determine the effect of the magnetic force on the rotor assembly. Cover 112 is substantially cylindrical and the field magnets 96 and shield 100 are epoxied to the inner surface of the cover. The upper and lower ends of cover 112 are open to permit contact between solenoid 106 and flywheel 94, and the cover is removed by simply removing bracket 116, temporarily decoupling shaft 90 from stand 114, slipping off the cover and then recoupling the shaft to the stand.

Referring now to FIGS. 7 and 8, another embodiment of the invention incorporates a stationary high permeance shield 118 positioned between a field magnet 120 and rotor 122. The rotor 122 contains a permanent magnet located on the distal end of a reinforced portion 124 of the rotor 122 and, of particular importance, the shield 118 blocks only one portion of the field magnet 120. Accordingly, the remaining portion of magnet 120 is exposed to rotor 122.

Referring to FIG. 8, field magnet 120 is spaced apart from rotor 122 forming an air gap 128 between the field magnet 120 and rotor 122. The rotor 122 is mounted on a stand 130 through a shaft 132, and a flywheel 135 is attached to the shaft at the opposite end thereof.

Rotation of rotor 122 is effected by field magnet 120 and stationary shield 118. Initially, rotor magnet 126 is attached to shield 118 causing the rotor 122 to rotate counterclockwise as shown in FIG. 7. As the rotor magnet 126 approaches shield 118, the "flywheel effect" of the mass of the rotor 122 and the flywheel 135 causes the rotor to rotate past shield 118 so that magnet 126 comes into view of field magnet 120. Since like-poles of the rotor magnet 126 and filed magnet 120, respectively, are facing each other, magnetic repulsion causes the rotor to continue to rotate counterclockwise by imparting a "kick" to the rotor. The "kick" is, of course, partially smoothed by the mass of the rotor 122 and flywheel 135. The rotor 122 eventually ceases rotation, even when precision bearings are used to support shaft 132; however, the "kicking" action of the rotor each time a rotor magnet 126 crosses a field magnet 120 demonstrates the effect of the magnetic force.

Referring to FIG. 9, a multiple rotor assembly 134, based on the embodiment of FIGS. 7 and 8, comprises rotors 136 and 138 containing a plurality of permanent magnets 140, 141 embedded in the periphery of the rotors. The rotors are rotationally displaced from each other with rotor 138 being slightly clockwise with respect to rotor 136. The amount of angular displacement of adjacent rotors is determined by the following formula:

$$\theta_3 = 360/n_3 n_4$$

Where:
$\theta_3$ is the angular displacement of adjacent rotors;
$n_3$ is the number of magnets on each rotor; and
$n_4$ is the number of rotors in the assembly.

Field magnets 142,143, respectively are located adjacent the peripheries of the rotors 136 and 138, and are vertically in-line to each other, as shown. An annular nonferromagnetic band 144 is disposed in the air gaps between the field magnets 142,143 and rotors 136,138. Each band 144 contains a high magnetic permeance shield 146 adjacent each field magnet 142,143 extending to the midpoint of the field magnet and covering one-half thereof. The remaining one-half of each field magnet 142,143 is exposed to the rotor 136, 138.

Although not shown for simplicity, the field magnets 142,143 and bands 144 may be mounted to a transparent cover similar to cover 112 is FIG. 6b, and, as discussed above, the cover is removable.

During rotation of rotors 136,138, rotor magnets 140,141 are successively attracted to the high magnetic permeance shields 146, and the "flywheel effect" causes the rotor magnets to overshoot the extent of the shields and come into view of the field magnets 142,143. Subsequently, magnetic repulsion causes the rotors 136,138 to continue rotation beyond the field magnets 142,143. Since the rotors 136,138 are angularly displaced with respect to each other, the rotor magnets on each rotor are successively exposed to field magnets, and the assembly 134 receives successive "kicking" during rotation. As aforementioned, the rotation of the rotor assembly 134 is not sustained without adding external energy, and the assembly is initially rotated using a solenoid (not shown) or other means.

In summary, a simple apparatus is provided for demonstrating the effect of magnetic force in a simple and amusing manner. However, in this disclosure, there is shown and described only the preferred embodiments of the invention, and, as aforementioned, it is to be understood that the invention is capable of use in various other combinations and environments, and is capable of changes or modifications within the scope of the inventive concept as expressed herein. For example, although particular numbers of rotors and particular numbers of rotor magnets and field magnets are disclosed by way of example, it is apparent that other numbers of rotors and magnets can be used. Also, although permanent magnets have been shown in the preferred embodiments, obviously, electromagnets can be used, with electric current being supplied to the rotor magnets via conventional slip rings. Also, although a solenoid is shown as a means for imparting initial rotation to the apparatus, other means including manual means could be used without departing from the spirit of the invention.

What is claimed is:

1. An apparatus for demonstrating magnetic force comprising rotor means, rotor magnet means attached to said rotor means for rotation therewith; stationary field magnet means spaced apart from said rotor magnet means and in proximity thereto, like-poles of said rotor magnet means and said field magnet means being in facing relationship to each other, an air gap being formed between said rotor magnet means and said field magnet means; stationary magnetic shielding means located in said air gap, said shielding means being formed of a high magnetic permeance material and shielding only a portion of said field magnet means from said rotor magnet means, said rotor magnet means being first attracted to said shielding means causing rotation of said rotor, and then repelled by said field magnet means as said rotor magnet means is exposed to said field magnet means during rotation.

2. The apparatus of claim 1, wherein said rotor magnet means comprises a plurality of magnets embedded in an outer rim of said rotor means.

3. The apparatus of claim 1, wherein said rotor means includes a plurality of rotors mounted on a common shaft.

4. The apparatus of claim 3, wherein said rotor magnet means includes a plurality of magnets embedded in an outer periphery of each of said rotors and equispaced therearound, and said field magnet means includes a plurality of sets of magnets arranged around each of said rotors in a one-to-one relationship with respect to said rotor magnet means.

5. The apparatus of claim 3, wherein each of said rotors is angularly displaced with respect to an adjacent rotor on said common shaft.

* * * * *